Sept. 14, 1926. Re. 16,421

W. L. JOHNSON ET AL.

EXTINGUISHER

Original Filed Oct. 14, 1922

Inventors

W. L. Johnson

J. M. Harris, Jr.

By Lacey & Lacey, Attorneys

Reissued Sept. 14, 1926. Re. 16,427

UNITED STATES PATENT OFFICE.

WILLIAM LAFAYETTE JOHNSON AND JAMES MITCHELL HARRIS, JR., OF DETROIT, MICHIGAN, SAID HARRIS ASSIGNOR TO SAID JOHNSON.

EXTINGUISHER.

Original application filed October 14, 1922. Renewed December 17, 1924, Serial No. 504,601. Original No. 1,524,262, dated January 27, 1925. Application for reissue filed January 4, 1926. Serial No. 75,[illegible].

This invention has for its object the production of a safety gas appliance, designed for use with the valve to effectively and positively close the valve, and thereby eliminate any possible escape of gas which may be caused by one neglecting to properly close the valve.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

The appliance forming the subject matter of the present invention embodies spaced hook-like members 10 which are adapted to engage the gas pipe 11 to assist in supporting the appliance in position for use. The hook-like members support an arcuate-shaped frame, the body portion of which is indicated at 11', and which frame includes radially disposed members 12 which have their corresponding inner extremities closely related and connected together by means of a resilient clamp 13 which is adapted to encircle and be secured upon the collar or gland through which the valve steam passes. The radially disposed members 12 project beyond the arcuate-shaped member 11' and have their extremities curved in the same direction, as at 14, for a purpose to be hereinafter described.

Figure 1:
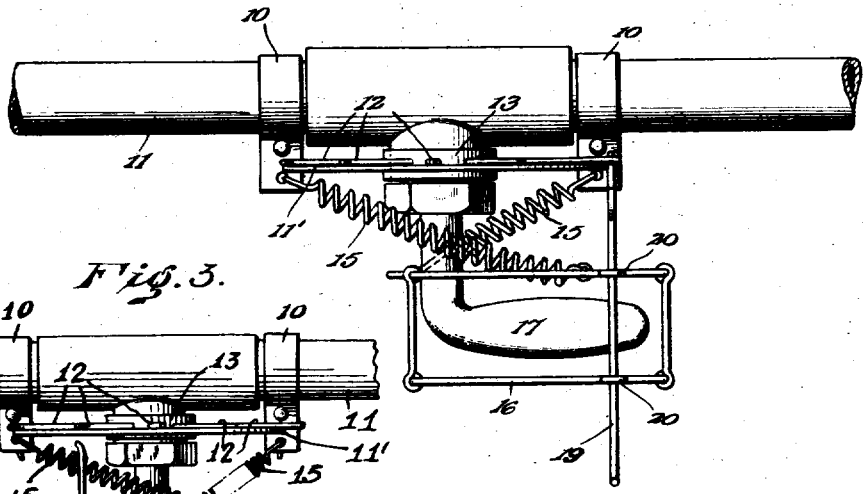
Figure 1 is a view in elevation showing the appliance associated with a gas fixture and the parts in open position.
Figure 3:
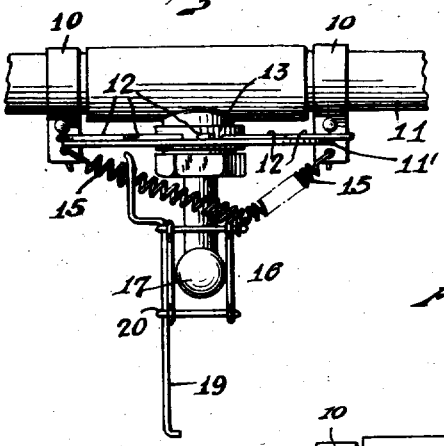
Figure 3 is a view similar to Figure 1, showing the position of the parts when the valve is closed.
Figure 2:
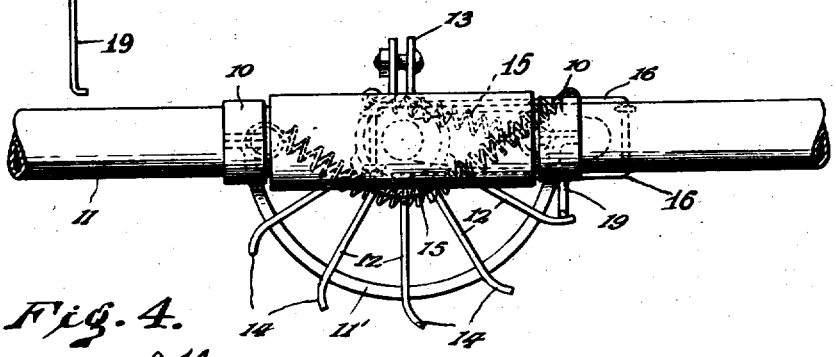
Figure 2 is a plan view.
Figure 4:
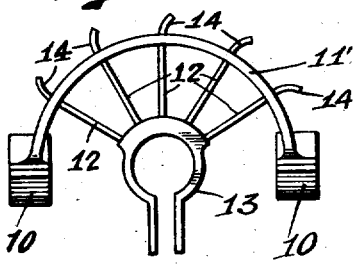
Figure 4 is a fragmentary detailed view of a part of the appliance.

Depending from the arcuate-shaped member 11', or the hooks 10 at the ends thereof, are diagonally disposed coiled springs 15 which support an elongated frame-like member 16, the frame-like member being disposed to receive the key or handle of the valve, indicated at 17. The springs normally maintain the frame in the position shown in Figure 3 and as the frame receives the key of the valve it is obvious that the valve is held effectively closed under normal conditions. When it is desired to open the valve, it is necessary to turn the frame to the position shown in Figure 1 which, of course, places the springs under tension. The frame is held in this position by means of a manipulating rod 19 which slides in loops 20 carried by the frame. The rod is frictionally engaged by the loops 20 to hold it in any given position, it being understood that the rod is susceptible of vertical adjustment toward and away from the curved extremities 14 of the radially disposed members 12. When the valve is opened, the rod 19 is positioned to engage one of the curved extremities 14 of the members 12, and in this manner, the frame and the valve are held in the position illustrated in Figure 1. By engaging the holding rod 19 with one or another stop or hook 14, the valve may be held partly or entirely open and the rate of flow of fluid regulated as desired. It may be here noted that the frame 16 is an open box-like structure closely fitting around the crank handle 17 of the valve, so that the turning movement of the frame will be imparted directly to the handle. When the rod 19 is moved downwardly out of engagement from the curved extremity of the particular member 12 and subsequently released, the springs function to return the frame 18 to normal position and instantly close the valve. By reason of the construction and arrangement of parts shown and described, it is manifest that the appliance will effectively move the valve to its closed position and thereby eliminate any possible escape of gas which may be caused by a person neglecting to fully turn off the valve.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim is:

1. A safety appliance for a valve having a turning key, said appliance comprising a frame arranged to receive the turning key of the valve, means for supporting the frame in position for use, said means including resilient elements connected with the frame and adapted to be placed under tension when the frame is turned to open the valve, a manipulating rod slidably supported by the frame and designed to engage said supporting means in a manner to hold the frame in an adjusted position against the influence of said resilient elements.

2. A safety appliance for a valve having a turning key, said appliance of the character described, comprising a frame designed to receive the turning key of the valve, a supporting structure for said frame, said structure including an arcuate-shaped member, a resilient clamp, radially disposed members terminally connected with the clamp and said arcuate-shaped member and having curved extremities projecting beyond the latter, and resilient elements depending from said supporting structure and terminally connected with the frame, and a manipulating element carried by the frame and adapted to be utilized to turn the latter to open the valve against the tension of said resilient elements, and said manipulating element being further adapted to be moved into engagement with the curved extremities of the radially disposed members to hold the valve open in adjusted positions against the tension of the resilient elements.

3. A safety appliance for a valve having a turning key, said appliance including spaced hook-like supporting elements, an arcuate-shaped member terminally connected with said elements, a resilient clamp arranged between said elements, radially disposed members projecting from said clamp and connected with the arcuate-shaped member, said radially disposed members projecting beyond the arcuate-shaped member to provide curved extremities, a frame adapted to receive the turning key of the valve, resilient elements connected with the supporting elements and suspending said frame therefrom, and a manipulating rod slidably supported by the frame and adapted to cooperate with the curved extremities of the radially disposed member as and for the purpose specified.

4. A safety appliance for a valve having a turning key, said appliance comprising a frame arranged to receive the turning key of the valve, means for supporting the frame in position for use, said means including resilient elements connected with the frame and adapted to be placed under tension when the frame is turned to open the valve, a manipulating rod slidably supported by the frame-like member and designed to engage said supporting means in a manner to hold the frame in an adjusted position against the influence of said resilient elements.

5. A safety appliance for a valve having a turning key, said appliance comprising a frame designed to receive the turning key of the valve, a supporting structure for said frame, said structure including an arcuate-shaped member, a resilient clamp, radially disposed members terminally connected with the clamp and said arcuate-shaped member and having extremities projecting beyond the latter, resilient elements depending from said supporting structure and terminally connected with the frame, and a manipulating element carried by the frame and adapted to be utilized to turn the latter to open the valve against the tension of said resilient elements, and said manipulating element being further adapted to be moved into engagement with the extremities of the radially disposed member to hold the valve open in adjusted positions against the tension of the resilient elements.

6. A safety appliance for a valve having a turning key, said appliance including spaced hook-like supporting elements, an arcuate-shaped member terminally connected with said elements, a resilient clamp arranged between said elements, radially disposed members projecting from said clamp and connected with the arcuate-shaped member, said radially disposed members projecting beyond the arcuate-shaped member at their extremities, a frame adapted to receive the key of the valve, resilient elements connected with the supporting elements and suspending said frame therefrom, and a manipulating rod slidably supported by the frame and adapted to co-operate with the extremities of the radially disposed members as and for the purpose specified.

7. A safety appliance for a valve having a turning key, said appliance comprising a support constructed to be secured upon a valve casing and to project laterally therefrom, a plurality of stops on said support arranged concentric with the valve casing, a frame to be secured about the turning key of the valve stem and turn therewith, resilient connections between the frame and the support tending constantly to hold the valve in closed position, and a holding rod carried by the frame and selectively engageable with the stops to hold the frame and valve in set positions.

In testimony whereof, we hereto set our hands.

WILLIAM LAFAYETTE JOHNSON. [L. S.]
JAMES MITCHELL HARRIS, Jr. [L. S.]